United States Patent [19]

Theiler

[11] 4,411,922

[45] Oct. 25, 1983

[54] PROCESS FOR PREPARING COOKED MEAT HAVING REDUCED LEVELS OF N-NITROSAMINES

[75] Inventor: Richard F. Theiler, Scottsdale, Ariz.

[73] Assignee: Armour and Company, Phoenix, Ariz.

[21] Appl. No.: 335,008

[22] Filed: Dec. 28, 1981

Related U.S. Application Data

[63] Continuation-in-part of Ser. No. 286,743, Jul. 27, 1981.

[51] Int. Cl.³ .......................... A23B 4/02; A23B 4/14
[52] U.S. Cl. .................................. 426/266; 426/302; 426/641; 426/652
[58] Field of Search ............... 426/264, 265, 266, 281, 426/332, 335, 533, 641, 646, 650, 652

[56] References Cited

U.S. PATENT DOCUMENTS

| | | |
|---|---|---|
| 2,770,550 | 11/1956 | Hall et al. |
| 2,863,777 | 12/1958 | Dekker et al. |
| 2,902,369 | 9/1959 | Komarik |
| 2,974,047 | 3/1961 | Hohmes |
| 3,672,913 | 6/1972 | Podebradsky |
| 3,868,468 | 2/1975 | Tompkin ............................ 426/243 |
| 3,901,981 | 8/1975 | Draudt ............................... 426/266 |
| 3,966,974 | 6/1976 | Bharucha et al. ................... 426/265 |
| 4,112,133 | 9/1978 | Rao et al. ........................... 426/650 |
| 4,250,199 | 2/1981 | Underwood et al. ............... 426/533 |
| 4,342,789 | 8/1982 | Ueno et al. ...................... 426/281 X |

FOREIGN PATENT DOCUMENTS

| | | | |
|---|---|---|---|
| 549657 | 12/1957 | Canada ............................... 426/266 |
| 411006 | 5/1934 | United Kingdom ................ 426/266 |

OTHER PUBLICATIONS

Gorbatov et al., Liquid Smokes for Use in Cured Meats, *Food Technology*, 25, 71–77 (1971).
Booth et al., A New Approach to Wood Smoke Flavoring, *Food Trade Review*, 25, 26, 32, Jun. 1971.
Red Arrow Products Technical Directory, pp. 1–32.
Knowles et al., Nitrosation of Phenols in Smoked Bacon, *Nature*, 249, pp. 672–673, Jun. 1974.
Knowles et al., Phenols in Smoked Cured Meats, Phenolic Composition, etc., *J. Sci. Fd. Agric.*, 26, pp. 189–196, 1975.
Knowles et al., Phenols in Smoked Cured Meats: Nitrosation of Phenols, etc., *J. Sci. Fd. Agric.*, 26, pp. 267–276, 1975.
Davies et al., Catalytic Effect of Nitrosophenols on N–Nitrosamine Formation, *Nature*, 266, pp. 657–658, Apr. 1977.
Fiddler et al., Inhibition of Volatile Nitrosamines in Fried Bacon by Use of Cure Solubilized $\alpha$–Tocopherol, *J. Agric. Food Chem.*, 26, 653–656, 1978.
Pensabene et al., Effect of $\alpha$–Tocopherol Formulations on the Inhibition of Nitrosopyrrolidine etc.
O'Brien, USDA Acts on the Bacon Dilemma, *Food Product Development*, pp. 32–37, Jul. 1978.

*Primary Examiner*—Arthur L. Corbin
*Attorney, Agent, or Firm*—Frank T. Barber

[57] ABSTRACT

A process for preparing cured meat which, when cooked for consumption, contains substantially reduced levels of N-nitrosamines. The process comprises the steps nitrite-curing, heat processing and slicing a meat product and then spraying or otherwise applying to the external surfaces of the resulting slices, after completion of said nitrite-curing and before cooking, a treating solution containing a tocopherol, liquid smoke and reducing sugar.

5 Claims, No Drawings

PROCESS FOR PREPARING COOKED MEAT HAVING REDUCED LEVELS OF N-NITROSAMINES

CROSS-REFERENCE TO RELATED APPLICATIONS

This application is a continuation-in-part of co-pending application Ser. No. 286,743, filed July 27, 1981, entitled "Process for Preparing Cooked Meat Having Reduced Levels of N-Nitrosamines."

BACKGROUND OF THE INVENTION

This invention relates to a process for preparing cured meat and, more particularly, to a process for preparing cured meat which, when cooked, will have reduced levels of N-nitrosamines.

For many years it has been common practice to prepare cured meat by treating the uncured meat with a curing composition and then smoking the cured product to impart a desirable flavor. A major component of the composition is sodium nitrite which inhibits the germination of Clostridium botulinum spores, thus ensuring that the cured product will be free of the deadly toxin produced by this bacterium. In recent years, however, much controversy has surrounded the use of sodium nitrite because there have been allegations that residual nitrite from the curing composition can react with organic amines present in various cured meat products to form carcinogenic nitrosamines. This problem is accentuated with certain products because nitrosamine formation is induced by the elevated temperatures encountered when these products are cooked for consumption; i.e., those exceeding 300° F.

Many approaches have been considered in seeking a remedy to this problem and proposed remedies have included eliminating nitrite from the curing composition or reducing residual nitrite levels in the cured product. Neither of these approaches is particularly satisfactory, however, because there is presently no suitable substitute for nitrite, and because reducing nitrite levels could increase the likelihood that C. botulinum spores would grow in the cured product.

Another approach has involved a search for substances to be added to the curing composition which might inhibit the formation of nitrosamines by interfering in some way with the nitrite/amine reaction by which the nitrosamines are formed. This approach has been hampered by the unpredictability of chemical reactions in the complex meat system which forms the environment for the reaction in question. Although results obtained by various workers have, for this reason, been inconsistent and contradictory, a number of substances have been identified which appear to exhibit some degree of inhibitory effect. For example, compounds such as sodium ascorbate, sodium erythorbate, alpha-tocopherol, etc. have been reported in the literature as having the ability to reduce nitrosamine formation. (See Fiddler et al, *J. Agric. Food Chem.*, Vol. 26, No. 3, 1978.)

One of the deficiencies of the inhibiting substances referred to above is their limited inhibitory action. In most cases, the substances have been found to cause nitrosamine reductions of up to 50%, but this still leaves a substantial problem in dealing with the remaining 50%. There has been an intensive search for more potent means of inhibiting the nitrosamine reaction.

My co-pending application Ser. No. 286,743, supra, describes an invention which is based on the discovery that substantially greater nitrosamine reductions can be achieved in cured meats by introducing into the uncured meat a nitrite curing composition, together with a tocopherol and an additional inhibiting substance which may be either a liquid smoke or a reducing sugar, or a combination thereof, and thereafter processing the meat to effect curing. In the making of said invention it was found that, while the tocopherol, the liquid smoke and the reducing sugar each is capable of reducing nitrosamines, the above combinations provide reductions substantially greater than can be obtained with any of the inhibitors used alone. Moreover, it was found that the improved inhibitory action could be obtained without significantly affecting the level of residual nitrite in the cured meat and thus the combination of inhibitors while reducing nitrosamine levels does not interfere with the C. botulinum protection offered by the nitrite itself.

SUMMARY OF THE PRESENT INVENTION

The present invention is based on the discovery that substantially improved nitrosamine inhibitory action can also be achieved if the above combination of inhibitors is applied at a later stage—namely, after the meat has been cured, heat processed and sliced, but before cooking. For example, rather than incorporate the inhibitors in the curing solution to be injected into bacon bellies, or mixing them in ground meat prior to curing, it is possible to apply the combination of inhibitors, by spraying, dipping or other equivalent means, to the surface of slices after the meat has been cured, heat processed and sliced.

The process of the present invention therefore comprises the steps of nitrite-curing, heat processing and slicing a meat product and then applying to the resulting slices, before cooking, a tocopherol and an additional inhibitor substance which may be either a liquid smoke or a reducing sugar, or a mixture thereof.

DESCRIPTION OF THE PREFERRED EMBODIMENTS

The invention is applicable to any of the kinds of cured meat products which are normally marketed or consumed in sliced form. The meat may be of the type which are cured in unground form by injection of the curing solution into intact pieces of meat, or by immersion of the meat in the solution for a protracted period of time. The more popular examples are ham and bacon and similar pork products, but equivalent forms from other species such as beef, veal, poultry and the like are also contemplated. The invention is also applicable to meats which are ground and mixed with other ingredients, such as fat and water, to provide emulsions which are cured are processed into various forms of sausage, such as bologna; but the meat may also be in the form of ground roll or load products which are prepared in cured form and are sliceable.

In the following specification the invention will be described in terms of its application to the production of cured, sliced bacon, but it will be understood that the invention is also applicable to the other forms and species of cured, sliced meat referred to above.

Cured bacon is typically prepared by immersing whole green bellies in pickle for a prescribed period of time or by injecting the pickle directly into the green bellies. Commercial procedures most commonly involve injection of the bellies because the curing process can be rapidly and efficiently completed. When cured in this way a quantity of pickle, usually constituting 8-15% of the weight of the meat, is injected; thus for example, if a 7-kilogram bacon belly were pumped (i.e., injected) with pickle at a level of 10%, a quantity of 700 grams of pickle would be used. The pickle normally contains a number of ingredients in addition to sodium nitrite. These include buffering agents such as sodium tripolyphosphate to stabilize the nitrite, agents to facilitate curing such as sodium erythorbate or ascorbic acid, and sodium chloride.

Following the step of injecting or otherwise introducing the curing pickle, the bacon bellies are normally drained for a period of time, combed and hung on trees in the conventional smokehouse manner, and then placed in heated, smoke-laden currents of air in the smokehouse. The times, temperatures and other conditions utilized in conventional smokehouse processing are well documented in the art. For example, in one such conventional procedure, cured bacon bellies are placed in a smokehouse at a temperature of 140°-145° F. and are held there until the internal temperature of the meat reaches about 130°-132° F. which will ordinarily require four to five hours in an air-conditioned smokehouse. The temperature of the house is then lowered to about 130° F. and held for another eight hours until the bellies are properly finished.

It is to be noted that, although liquid smoke may be used as a source to provide the smoke-laden currents of air in the processing step just described, application of liquid smoke in this manner and at this stage of the process is not effective to bring about any significant reduction of N-nitrosamines when the bacon is cooked for consumption.

Following the smokehouse processing step, the bellies are chilled in the ordinary manner in a bacon chill freezer for a period of 24 to 48 hours until the internal temperature is in the neighborhood of 24°-26° F., and then the bellies are subjected to pressure in a molding box or machine of conventional design and operation, the purpose of this being to square up the slab so that the slices obtained during the subsequent slicing operation will be as uniform as possible. The bellies are then sliced on high speed, rotary blade slicing machines to provide bacon slices which normally have a thickness in the range of 0.08 to 0.125 in.

In the practice of the present invention, slices of bacon or of the other forms of cured meat products referred to above are treated by applying to their surfaces a tocopherol and an additional inhibitor substance which may be either a reducing sugar or a liquid smoke, or a mixture thereof. The application may be by spraying, atomizing, dipping or other like means.

The tocopherol to be used in the invention may be any of the group of chemically related, lipid soluble substances that possess vitamin E activity. They are present in vegetable oils, cereals, nuts and leafy vegetables, vegetable oils being the most important source. The most common tocopherol is alphatocopherol, but beta, gamma and delta tocopherols also occur naturally. The word "tocopherol" as used herein contemplates all of these compounds and their derivatives, particularly the acetate and succinate esters, and mixtures thereof. Certain of these compounds are listed as GRAS for use in food products as chemical preservatives, or as nutrients and/or dietary supplements.

Reducing sugars, as used in the invention, are those sugars which will reduce mild oxidizing agents such as Fehling's solution, Tollen's Reagent and Benedict's solution, and examples of such sugars are glucose, maltose, fructose and lactose. Non-reducing sugars, such as sucrose from sugar cane, beet sugar, corn sugar, etc. have virtually no effect on N-nitrosamine formation and are not effective in the present invention.

Liquid smoke, as used in the invention, should be of a modified form having relatively reduced levels of color-forming constituents, in order to prevent discoloration of the meat slices in this topical application of the smoke to the slices. An appropriate treating solution may be prepared using Aro-Smoke, a product of Red Arrow Products Company, having a carbonyl to phenol ratio of approximately 1.4 to 1.

An alternate treating solution may be prepared using the following procedure: An aqueous solution of wood smoke is prepared and refined by means well known in the art or, if so desired, a commercial aqueous wood smoke, such as Red Arrow's CharSol C-10, (which has a carbonyl to phenol ratio of 7.1 to 1) may be used as the starting solution. The pH of the solution is adjusted to ca 10-11 with an appropriate base, such as sodium hydroxide, and the mixture is extracted with diethyl ether to remove certain of the carbonyl-containing compounds. The aqueous solution is reacidified to a pH of ca 2-3 with an appropriate acid, such as hydrochloric acid, and the mixture is extracted with diethyl ether. After evaporation of the ether, a water-insoluble extract is obtained for which the ratio of carbonyl-containing compounds to phenolic constituents is in the range of 0.5-5 to 1. Preferably, this ratio will be in the range of 0.75-3 to 1.

If it is desired to use the above water-insoluble extract in an aqueous treating solution, it is preferable to include a food grade emulsifier. A wide range of emulsifiers is available and the effective amount of emulsifier required will depend on the characteristics displayed by each individual emulsifier. Polysorbate emulsifiers are generally satisfactory to practice the present invention and polysorbate 80 is particularly preferred when not less than 0.2% of emulsifier is used, based on the weight of the solution. Certain other emulsifiers which provide suitable emulsification may also exhibit other characteristics which make them less desirable to use. Lecithin, for example, has been shown to increase N-nitrosopyrrolidine formation. Therefore, in view of the result which is to be achieved by utilizing the process of the present invention, emulsifiers which exhibit this tendency should be avoided.

A preferred way of carrying out the process of the present invention is to prepare a treating solution containing the desired inhibitors and then spraying the solution on the surface of the slices as they leave the slicing machine and are carried on a conveyor belt to the weighing and packaging area. Any suitable equipment involving nozzles which provide atomization or spray application may be utilized. For example, a Preval sprayer unit, manufactured by Precision Valve Corporation, Yonkers, N.Y., is useful in the practice of the invention. Other means of application, such as dipping or immersing the slices in a bath of treating solution, are also contemplated by the invention.

The amounts of inhibitor materials which are added to the treating solution can vary depending on a number of factors, including the amount of treating solution that can be held on the surface of the bacon slices and the amount of flavor and color that is desired for the cooked bacon. However, it has been found that nitrosamine levels will be reduced if the concentration of tocopherol is in the range of 10–1,000 ppm based on the weight of the sliced meat, the liquid smoke is in concentration to provide 5–400 ppm phenols and 10–2,000 ppm carbonyl compounds based on the weight of the sliced meat, and the concentration of reducing sugar is in the range of 150 ppm to 30,000 ppm based on the sliced meat weight. To obtain superior flavor characteristics, the concentration range for the tocopherol will be 100–500 ppm, for the phenols 40–120 ppm, for the carbonyl compounds 30–360 ppm, and for the reducing sugar 1,000–20,000 ppm, all said ppm concentrations being based on the weight of the meat slices.

In the practice of the present invention, it is of course essential that the inhibiting material be applied to the bacon slices prior to their being exposed to temperatures as high as, or approaching, those involved in cooking the bacon for consumption. It is believed that the formation of N-nitrosamines is catalyzed by temperatures approaching 300° F. or higher, and if the application of the inhibiting material, as in the present invention, is delayed until after the bacon slices have been subjected to such temperatures, either by frying or precooking, then significant quantities of N-nitrosamines may already have been formed prior to application of the inhibiting material, and the purpose of the invention may have been defeated.

In practice of the invention it has been found that when tocopherol and liquid smoke are used in combination, substantially greater reductions in nitrosamines are obtained than when the individual additives are used alone. Also, when tocopherol and reducing sugar are used in combination, substantially greater nitrosamine reductions are obtained than with the individual components. Further, when all three are used together, dramatically greater reductions result than from the use of any of the individual components. Moreover, in the invention nitrites are used in the conventional manner and in the conventional quantities to cure and flavor the bacon and protect it against harmful organisms such as C. botulinum; and in addition the bacon contains substantially reduced levels of N-nitrosamines upon frying or cooking at high temperatures.

The following examples are illustrative of the practice of the invention. It will be understood of course that various modifications thereof can readily be evolved in view of the guiding principles and teachings provided herein.

EXAMPLE 1

A 200-ml quantity of CharSol C-10 was treated according to the procedure set forth above to give 8.4 g of oily extract. A 29% solution of the extract in polysorbate 80 was prepared and the phenolic- and carbonyl compound constituents of this smoke ("Prepared Smoke" as used in this Example) were assayed spectrophotometrically using 2,6-dimethoxyphenol and 2-butanone as the standards, respectively. From the assay results the carbonyl/phenol ratio was determined. Similar assays and ratio calculations were also made for Aro-Smoke (which contained ca 80% polysorbate), CharSol C-10, and Royal Smoke, another commercial aqueous liquid smoke from Griffith Laboratories. The following results were obtained.

| Sample | Phenols (mg/ml) | Carbonyls (mg/ml) | Ratio Carbonyls:Phenols |
|---|---|---|---|
| Prepared Smoke | 35 | 54 | 1.5:1 |
| Aro-Smoke | 39 | 54 | 1.4:1 |
| Royal Smoke | 7.5 | 79 | 10.5:1 |
| CharSol C-10 | 14 | 99 | 7.1:1 |

EXAMPLE 2

The following test results demonstrate that application of liquid smoke to the external surface of whole bellies during smokehouse processing has no significant effect in the reduction of N-nitrosamines in the cooked or fried bacon.

Twenty-four green skin-on bacon bellies were obtained, divided into two groups of 12, and skinned prior to processing. Both groups were pumped at levels of 13%, based on the weight of the bellies, with the following curing pickle:

| Ingredient | Percentage |
|---|---|
| Water | 85.64 |
| Sodium Chloride | 12.50 |
| Sodium Tripolyphosphate | 1.25 |
| Sodium Erythorbate Monohydrate | 0.50 |
| Sodium Nitrite | 0.10 |
| Veralock (a flavoring material) | 0.01 |

Both groups (Group A and Group B) were heat processed under identical conditions to cure the bacon, and the bellies in Group B were also externally smoked with atomized CharSol C-10 at ca five times the amount of liquid smoke normally employed in commercially produced bacon. The bellies were then chilled and two days later approximately 1-pound center drafts containing ca 17–18 slices per draft were taken from each belly.

Five days after slicing, bacon samples from each group were fried at 340° F. for three minutes per side, and the fried bacon were analyzed for N-nitrosamine content using N-nitrosopyrrolidine as the standard. The following results were obtained.

| Group | N—Nitrosopyrrolidine (ppb)* |
|---|---|
| A. No external smoke | 14 ± 5 |
| B. External smoke | 16 ± 3 |

*Data represents the mean ± the standard deviation from N = 16 different determinations.

EXAMPLE 3

Twelve skin-on bellies having green weights averaging 18 to 20 pounds were processed in a commercial packing plant according to USDA approved procedures. The processing involved injecting the bellies with a conventional curing pickle containing approximately 120 ppm sodium nitrite; combing and draining; processing in a smokehouse to an internal temperature of approximately 136°–140° F.; tempering; chilling; molding; and finally slicing and putting up in drafts consisting of approximately 500 grams of bacon, totaling 17 to 18 slices per draft, the average thickness of each slice being approximately 0.09 in.

Four of the center drafts from each of the 12 bellies were selected for testing, as follows:

| | |
|---|---|
| No. 1 Drafts (Control) | Received no treatment |
| No. 2 Drafts (Dextrose) | The slices in these drafts were sprayed with 6.25 grams of an aqueous solution of dextrose containing approximately 1.25 grams dextrose (2,500 ppm dextrose based on the weight of the bacon) |
| No. 3 Drafts (Dextrose plus Aro-Smoke) | The slices in these drafts were sprayed with 6.25 grams of an aqueous solution containing approximately 1.25 grams dextrose (2,500 ppm dextrose based on the weight of the bacon) and 1 gram Aro-Smoke (2,000 ppm Aro-Smoke based on the weight of the bacon) |
| No. 4 Drafts (Dextrose plus Aro-Smoke plus Tocopherol) | The slices in these drafts were sprayed with 6.25 grams of an aqueous solution containing approximately 1.25 grams dextrose (2,500 ppm dextrose), 1 gram Aro-Smoke (2,000 ppm Aro-Smoke) and .357 grams of a 70% solution of tocopherol (500 ppm tocopherol), all said ppm concentrations being based on the weight of the bacon. |

After the above spray application, the drafts were vacuum packaged, stored for 21 days at 36°–40° F., and then fried and analyzed. In the analysis for N-nitrosamines, 12 samples from each type of draft (48 total samples) were fried 3 minutes on each side in a preheated fry pan at 340° F.±10° F. After blotting the fried bacon slices with paper toweling (to remove excess fat), nitrosamine values were determined by Thermal Energy Analyzer (T.E.A.) methodology, following the procedures set forth in Fine et al, *Anal. Chem.*, 47, 1183 (1975). The results are set forth as follows:

| Treatment | N—Nitrosopyrrolodine (ppb)* | % Reduction of N—Nitrosopyrrolidine Compared to Control |
|---|---|---|
| No. 1 Drafts (Control) | 35.8 | — |
| No. 2 Drafts (Dextrose) | 15.1 | 57.8 |
| No. 3 Drafts (Dextrose plus Aro-Smoke) | 9.3 | 74.0 |
| No. 4 Drafts (Dextrose plus Aro-Smoke plus Tocopherol) | 4.8 | 86.6 |

*Average of 12 different samples

I claim:

1. A process for preparing a cured meat product which, when cooked for consumption, contains substantially reduced levels of N-nitrosamines, said process comprising the steps of nitrite-curing, heat processing and slicing the meat product and then applying to the external surfaces of the resulting slices, after completion of said nitrite-curing and before cooking, a treating solution containing a tocopherol, liquid smoke, and reducing sugar.

2. The process of claim 1 wherein the concentration of said tocopherol is 10–1,000 ppm, the liquid smoke is in concentration to provide 5–400 ppm phenols and 10–2,000 ppm carbonyl compounds, and the concentration of said reducing sugar is 150 ppm to 30,000 ppm, all said ppm concentrations being based on the weight of the sliced meat.

3. The process of claim 1 wherein the concentration of said tocopherol is 100–500 ppm, the liquid smoke is in concentration to provide 40–120 ppm phenols and 30–360 ppm carbonyl compounds, and the concentration of said reducing sugar is 1,000–20,000 ppm, all said ppm concentrations being based on the weight of the sliced meat.

4. A process for preparing cured bacon which, when cooked for consumption, contains substantially reduced levels of N-nitrosamines, said process comprising the steps of nitrite-curing, heat processing and slicing bacon bellies and then applying to the external surfaces of the resulting slices, after completion of said nitrite-curing and before cooking, a treating solution containing A tocopherol, in concentration to provide from 10 to 1,000 ppm, based upon the weight of the bacon A liquid smoke in concentration to provide 5 to 400 ppm of phenols and 10 to 2,000 ppm carbonyl compounds, based on the weight of the bacon slices, and A reducing sugar in concentration to provide 150 to 30,000 ppm, based on the weight of the bacon slices.

5. A process for preparing cured bacon which, when cooked for consumption, contains substantially reduced levels of N-nitrosamines, said process comprising the steps of nitrite-curing, heat processing and slicing bacon bellies and then applying to the external surfaces of the resulting slices, after completion of said nitrite-curing and before cooking, a treating solution containing From 10 to 1,000 ppm of tocopherol, based upon the weight of the bacon slices, A liquid smoke in concentration to provide 5 to 400 ppm phenols and 10 to 2,000 ppm carbonyl compounds, based on the weight of the bacon slices, the ratio of carbonyls to phenols being within the range of 0.5–5 to 1, From 150 to 30,000 ppm of reducing sugar, based upon the weight of the bacon slices, and An effective amount of a food grade emulsifier which does not substantially increase N-nitrosamine formation.

* * * * *